Dec. 7, 1937.                J. FERGUSON                2,101,675
                            ELECTRIC FURNACE
                          Filed May 17, 1935
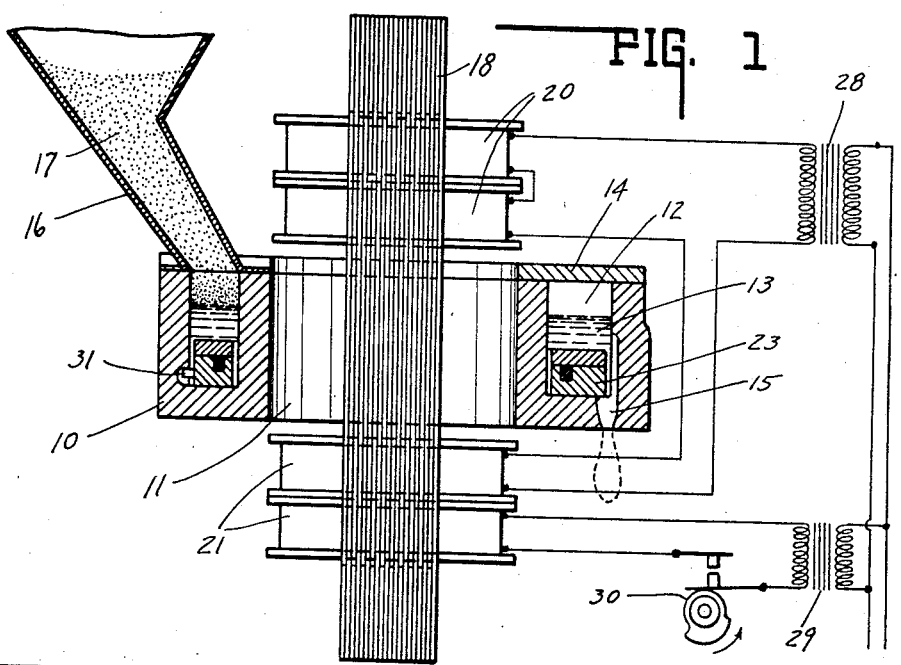
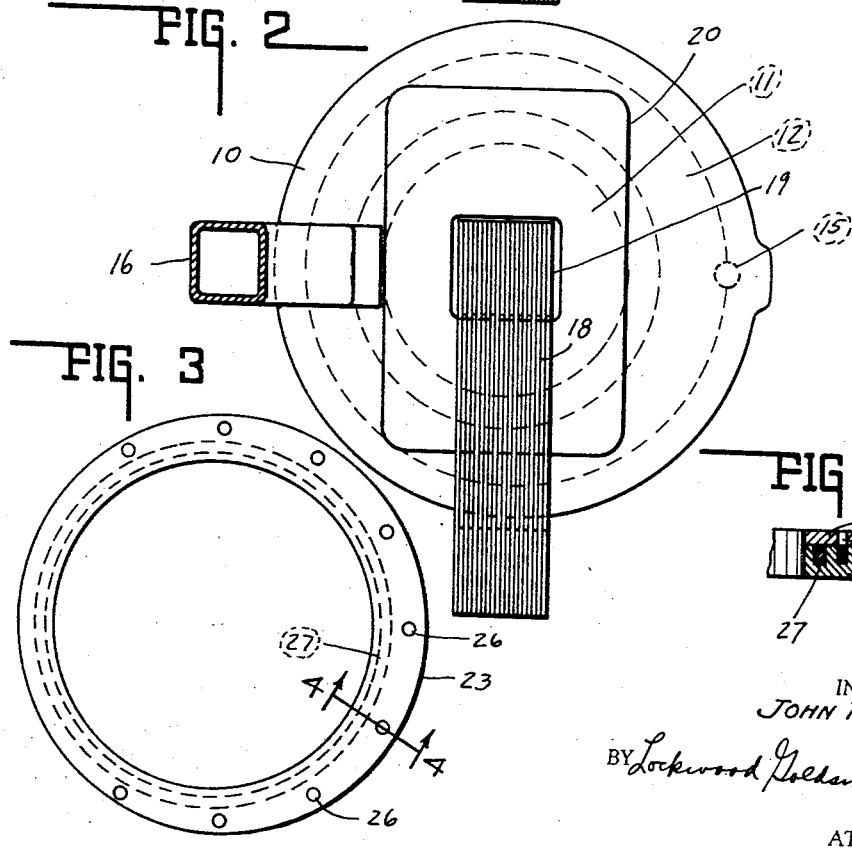
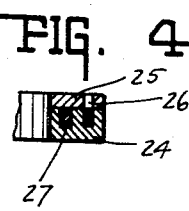
INVENTOR.
JOHN FERGUSON.
BY Lockwood Goldsmith & Galt
                                        ATTORNEYS.

Patented Dec. 7, 1937

2,101,675

UNITED STATES PATENT OFFICE 2,101,675

ELECTRIC FURNACE

John Ferguson, Indianapolis, Ind., assignor to Fairmount Glass Works, Incorporated, Indianapolis, Ind., a corporation Application May 17, 1935, Serial No. 21,916

16 Claims. (Cl. 13—6)

This invention relates to an electric furnace particularly adapted to the melting and refining of glass forming materials but equally applicable to many other uses.

The principal object of the invention is generally to improve upon the construction and operation of electric furnaces used in glass manufacture and to this end the invention resides in the various features hereinafter pointed out in more detail.

A more specific object of the invention is to provide a furnace in which the glass materials may be melted, refined and discharged in the shortest possible time, thus making unnecessary the immense reservoirs of molten glass required in other types of furnaces. In the present invention, the heat energy for melting and refining the glass is supplied by electric currents induced in a secondary conductor arranged to deliver heat by radiation, conduction or both to the contents of the furnace. By this means, a relatively large amount of heat energy can be produced in a relatively small space. Therefore, a relatively small amount of glass is under heat at any one time, and since it can be put through the heat cycle quite rapidly, a large amount of glass can be produced daily from a small furnace.

In order to produce the desired rapidity of the melting and refining operation, and to insure that the proper heat cycle of the glass material will be obtained in its passage through the furnace, it is important that the temperatures which the glass material will encounter in its cycle be properly graded. Preferably, the greatest amount of heat should be developed at the point where the cool raw material enters the furnace. This is accomplished in the present invention by reducing the cross sectional area of the secondary conductor at this point, thus providing a greater concentration of current and a higher temperature.

The preferred form of the invention comprises an induction furnace of the iron core type operating upon commercial frequencies of the order of 60 cycles per second.

One feature of the invention resides in the fact that the secondary conductor used is a closed ring of a refractory resistance material, preferably one of the allotropic forms of carbon, immersed in the molten material in the furnace, to which it delivers its heat by conduction and radiation. The molten material serves as an impervious envelope or shield protecting the conductor from oxidation at the high temperature of operation. Instead of graphite, however, there may be used in certain cases a closed ring or disc of a metal such as molybdenum which will not melt, dissolve or disintegrate in molten glass materials.

Another feature resides in the fact that the secondary conductor is varied in cross section to distribute the heat energy generated therein in such manner as to produce zones of greater or less temperature within the furnace. For the more common forms of glass, the hottest zone, and hence the smallest cross section of the conductor, is preferably at the point of entry of the unmelted batch material. The cross section of the conductor is graded from that point to a maximum adjacent the discharge opening, at which point it is desired that the glass have the proper viscosity for working in molding machines. With other types of glass it is necessary to provide a second zone of increased temperature adjacent the discharge opening.

Still another feature resides in the provision of means for causing movement of the secondary conductor in the molten material. This movement is preferably a vertical pulsation which aids materially in mixing the material to produce a homogeneous product and which also may be used to produce the usual pulsating discharge or "gob feed" from the discharge opening.

Another feature of the invention resides in the provision in certain cases of an auxiliary secondary conductor in the form of a core of a second conducting material within the carbon secondary conductor. This material is preferably of a higher specific conductivity than the carbon ring and thus permits a larger current to be carried with a ring of smaller dimensions. Molybdenum, or other material which will be solid at the operating temperature, is the preferred material but iron or lower melting materials may also be used. This core also serves to increase the specific gravity of the secondary conductor and thus to reduce its tendency to float in the molten material.

Other objects and features of the invention will be understood from the accompanying drawing and the following description and claims:

Fig. 1 is an elevational view of a preferred form of the furnace with the hearth shown in section. Fig. 2 is a plan view of the same. Fig. 3 is a plan view of the secondary conductor and Fig. 4 is a sectional view of the same taken on the line 4—4 of Fig. 3.

In the drawing there is shown, by way of illustration, a preferred form of the invention. The furnace proper consists of an annular structure 10 of refractory material having a central opening 11 and having an annular trough 12 serving as a hearth for retaining the molten glass forming material 13. The furnace is provided with a refractory cover 14, a discharge opening 15 at one side and an inlet chute 16 at the opposite side for supplying the unmelted batch material 17 from a suitable hopper.

A transformer core 18 of the usual closed rectangular form has a vertical portion 19 extending through the central opening 11 in the furnace structure. Primary windings 20 above the hearth and 21 below the hearth are wound about the vertical portion 19 of the core. A secondary conductor 23 is provided in the form of a two-piece ring of suitable resistance material lying within the hearth. Since the secondary conductor also surrounds the vertical portion 19 of the transformer core, it is inductively linked with the primary windings and a relatively large current is induced therein when the primary windings are supplied with alternating current at commercial voltage and frequency. This induced current heats the secondary conductor and, by conduction and radiation, heats the contents of the furnace.

The secondary conductor 23 herein illustrated comprises a lower section 24 and an upper section 25 secured thereto by dowel pins or screws 26 of the same material. In the lower section there is formed a channel containing an annular metallic core 27. The sections 24 and 25 and the dowels 26 are preferably formed of graphite but the amorphous form of carbon used for carbon electrodes and motor brushes may also be used.

The core 27 is preferably of molybdenum or other metal or alloy having a high melting point but may be of iron which has approximately the desired resistance characteristics and specific gravity. The iron in most cases is in the molten state at the usual operating temperature of the furnace. Since it carries a considerable electric current, it has the tendency to rupture, known as the "pinch effect", which is common to all elongated molten conductors. However, the pinch effect is overcome by proportioning the channel and the iron so that the iron in its molten state substantially fills the channel. Since a pinch or rupture at one point must be accompanied by an expansion at another point, a pinch becomes impossible when there is no room for expansion within the channel.

The use of the central core makes it possible to proportion the resistance, volume and specific gravity of the secondary conductor to the requirements of a particular installation. The graphite is lighter than molten glass and, therefore, tends to float therein, and the addition of the metallic core reduces this tendency. It is not desirable in most cases however to entirely overcome the buoyancy of the conductor. In many cases, particularly in small furnaces, the metallic core may be dispensed with entirely.

It will be noted that the conductor 23 has a smaller cross section at the point adjacent the intake chute 16 and the cross section increases uniformly in both directions around the hearth to a maximum adjacent the discharge opening 15. The current density and, therefore, the temperature is greatest at the point of least cross section of the conductor. There is thus provided a relatively hot melting zone adjacent the intake chute, two intermediate refining zones of less temperature and a discharge zone of least temperature adjacent the discharge opening. The glass materials pass successively through these zones and reach the discharge opening at the proper temperature and viscosity for discharge and for working in the usual molding machines. In practice, satisfactory results may be obtained with the smaller cross section equal to 75% of the larger cross section or less, depending largely upon the characteristics of the glass under process. For the more refractory types of glass, a zone of increased instead of decreased temperature is required at the discharge opening. For this purpose a second constriction in cross section of the secondary conductor is placed adjacent the discharge opening.

Since the primary windings 20 and 21 and the secondary conductor 23 have the form of solenoids each having a large number of ampere-turns, they exert upon each other relatively large electro-magnetic forces. The current in the conductor 23 being opposite to that in the primary coils, each primary coil repels the secondary conductor, the coils 20 above the hearth tending to drive the conductor downwardly and the coils 21 below the hearth tending to lift the same. This electro-magnetic action may be used to perform several important functions by properly proportioning the primary windings. By placing all or a large part of the primary windings above the furnace, the downward reaction may be made sufficiently strong to overcome entirely the buoyancy of the conductor and thus hold the same securely to the bottom of the hearth. On the other hand, the distribution of the primary ampere-turns may be periodically varied to cause an alternate upward and downward movement of the conductor.

In the illustrated embodiment of the invention, the two upper primaries 20 and one of the lower primaries 21 are connected in series and supplied with alternating current from a transformer 28 connected to any suitable source of alternating current. The number of ampere-turns in these three primaries is proportioned to give a net downward force sufficient to overcome the buoyancy of the secondary conductor and move the same downwardly in the molten glass. The second of the lower primaries 21 is supplied with alternating current in the same phase relation from a transformer 29 connected to the same power source. The last mentioned primary is so proportioned that the upward electromagnetic force exerted thereby is sufficient to overcome the net downward force of the other three and, therefore, to cause an upward movement of the secondary conductor. The current to the last mentioned primary is periodically interrupted by a make-and-break timing apparatus shown diagrammatically at 30. This apparatus may be driven by an electric motor or any other suitable means. The alternate reversal of the net electromotive force acting on the secondary conductor obviously causes the same to rise and fall within the molten bath on the hearth.

The alternate rise and fall of the secondary conductor performs the extremely useful function of thoroughly mixing the glass material during the refining process, thus facilitating the escape of seed and producing a more homogenous product. This movement may also be used to produce the well known gob feed by suitably placing the discharge opening with respect to the conductor. In the upward movement of the conductor the flow of the relatively viscous glass through the discharge opening is prevented, while on the downward movement the flow is accelerated to produce the gob required for manufacture of a glass article. The timing of the feed with the operation of a molding machine may obviously be accomplished by operating the timer 30 in conjunction with the timing mechanism of the molding machine.

In some cases, it is desirable to have the secondary conductor move bodily upward and downward. In other cases I prefer to provide a pivotal anchorage such as shown herein as a pin 31 of suitable material working in a recess in the wall of the hearth. This anchorage is placed on the opposite side of the furnace from the discharge opening and serves as a pivot about which the conductor may move in its rise and fall. This prevents excessive agitation of the glass in the neighborhood of the intake chute without diminishing the movement for gob feed at the discharge opening.

From the foregoing description it will be obvious that the invention has numerous advantages over other forms of electric melting, particularly over the type of furnace in which the molten glass itself acts as the resistor. The present invention provides an apparatus which is self starting from a cold condition. The purely resistance furnace must be started with a charge of molten glass or other conducting material since solid glass is not a sufficiently good conductor for starting. There being no electrodes in the glass, thermal loss is less. Transformer losses are also reduced since commercial voltage may be applied directly to the primary windings. The furnace has a more uniform operating characteristic since the resistance of the carbon secondary varies only slightly with change of temperature while the resistance of molten glass shows wide variations.

The foregoing specifications describe a preferred form of the invention, the details of which may be varied within wide limits without departing from the scope of the invention as defined by the following claims.

The invention claimed is:

1. An induction furnace including a hearth adapted to contain a charge of material, a primary winding supplied with alternating current, and a secondary conductor in heat exchange relation with the material on the hearth and inductively linked with the primary winding, said secondary conductor being in the form of a ring of relatively refractory resistance material having a core of less refractory conducting material of lower specific resistance.

2. An induction furnace including a hearth adapted to contain a charge of material, a primary winding supplied with alternating current, and a secondary conductor in heat exchange relation with the material on the hearth and inductively linked with the primary winding, said secondary conductor being in the form of a ring of carbon having a metallic core.

3. An induction furnace including a hearth adapted to contain a charge of material, a primary winding supplied with alternating current, and a secondary conductor in heat exchange relation with the material on the hearth and inductively linked with the primary winding, said secondary conductor being in the form of a ring of non-metallic refractory conducting material having a metallic core in a molten state at the normal operating temperature of the furnace.

4. An induction furnace including a hearth adapted to contain a charge of material, a primary winding supplied with alternating current, and a secondary conductor in heat exchange relation with the material on the hearth and inductively linked with the primary winding, said secondary conductor being in the form of a ring of non-metallic refractory conducting material having a metallic core in a molten state at the normal operating temperature of the furnace, said core being enclosed in an annular cavity within said ring and substantially filling said cavity to eliminate the pinch effect.

5. An induction furnace including an annular hearth adapted to contain a quantity of molten material, a secondary conductor immersed in said material, a transformer core linked with said secondary conductor, primary windings associated with said transformer core and arranged to exert electromagnetic forces upon said secondary conductor, and means for varying said forces to cause movement of the secondary conductor within said material.

6. An induction furnace including a hearth adapted to contain a charge of molten material, a primary winding supplied with alternating current, a secondary conductor inductively linked with said primary winding and immersed in said molten material, said secondary conductor being in the form of a ring of conducting material of lower specific gravity than the molten material, and means for exerting on said conductor a magnetic force tending to prevent said conductor from floating in said molten material.

7. An induction furnace including a hearth adapted to contain a charge of molten material, a primary winding supplied with alternating current, and a secondary conductor inductively linked with said primary winding and immersed in said molten material, said secondary conductor being in the form of a ring of conducting material of lower specific gravity than the molten material and having a core of heavier material tending to reduce the tendency to float.

8. An electric furnace including a hearth adapted to contain a charge of molten material and having a discharge opening, a refractory electric conductor immersed in said molten material, means for passing an electric current through said conductor, and means for applying varying electromagnetic forces to said conductor, whereby the same will be moved to produce pulsating discharge of said molten material through said discharge opening.

9. An electric furnace including a hearth adapted to contain a charge of molten material and having a discharge opening, an electric conductor in the form of a closed ring of refractory material immersed in said molten material, means for inducing an electric current in said conductor and for exerting an electromagnetic force thereon, and means for varying said electromagnetic forces to cause movement of said conductor in said material, said movement being such as to cause a pulsating discharge of the molten material through said discharge opening.

10. An electric furnace including an annular hearth adapted to contain a quantity of molten material, a secondary conductor in the form of a closed ring immersed in said material, a transformer core having a vertical portion passing through said hearth and said conductor, and a primary winding about said vertical portion above the hearth, said winding when supplied with alternating current serving to induce a current in said secondary conductor to heat the furnace and to exert a downward electromagnetic force thereon tending to prevent said conductor from floating in the molten material.

11. An electric furnace including an annular hearth adapted to contain a quantity of molten material, a secondary conductor in the form of a closed ring immersed in said material, a transformer core having a vertical portion passing through said hearth and said conductor, a primary winding about said vertical portion having portions above and below the hearth, said winding serving when supplied with alternating current to induce currents in said secondary conductor to heat the furnace, the portion thereof above the hearth exerting a downward electromotive force on said secondary conductor and the portion below the hearth exerting an upward electromotive force thereon, and means for varying the force exerted by one of said portions to cause movement of the secondary conductor within the molten material.

12. In an electric furnace, the combination of a hearth adapted to contain a quantity of molten material and having a discharge opening, an electrical conductor immersed in said material, said conductor being pivotally anchored at a point relatively remote from said discharge opening, means for passing an electric current through said conductor, and means for exerting a varying magnetic force thereon causing movement of the conductor about its pivotal anchorage, said movement being such as to produce a pulsating discharge of the material through said discharge opening.

13. In an electric furnace, the combination of a hearth adapted to contain a quantity of molten material and having a discharge opening, an electrical conductor immersed in said material, said conductor being in the form of a closed ring having a portion adjacent said discharge opening and having a pivotal anchorage at a point relatively remote from said discharge opening, and means for inducing an electric current in said ring to heat the furnace and for causing alternate upward and downward movements thereof about its pivotal anchorage to produce a pulsating discharge of the molten material through the discharge opening.

14. In an electric furnace, the combination of a hearth adapted to contain a quantity of molten material and having a discharge opening, an electrical conductor immersed in said material, said conductor being in the form of a closed ring having a portion adjacent said discharge opening, and means for inducing an electric current in said ring to heat the furnace and for causing alternate upward and downward movements thereof to produce a pulsating discharge of the molten material through the discharge opening.

15. In an electric furnace, the combination of a hearth adapted to contain a quantity of molten material and having a discharge opening, an electrical conductor immersed in said material, said conductor being in the form of a closed ring having a portion adjacent said discharge opening, and having a pivotal anchorage at a point relatively remote from said discharge opening, and primary windings inductively linked with said ring and serving when supplied with alternating current to induce a current therein for heating the furnace and to exert upward and downward magnetic forces thereon for moving the same about its pivotal anchorage to produce a pulsating discharge from said discharge opening.

16. An induction furnace including a hearth adapted to contain a charge of material, a primary winding supplied with alternating current, and a secondary conductor in heat exchange relation with the material on the hearth and inductively linked with the primary winding, said secondary conductor being in the form of a ring of non-metallic material having a metallic core.

JOHN FERGUSON.